Patented Apr. 15, 1952

2,592,681

UNITED STATES PATENT OFFICE 2,592,681

SILAHYDROCARBONS AND THEIR PRODUCTION

John T. Goodwin, Jr., Pittsburgh, Pa., assignor to Dow Corning Corporation, Midland, Mich., a corporation of Michigan No Drawing. Application April 20, 1948, Serial No. 22,252. In Great Britain July 1, 1947

12 Claims. (Cl. 260—448.2)

The present invention relates to the production of polymeric fluids which have the fundamental repeating structure —CH$_2$SiR$_2$— which are difunctional and to the fluids so produced.

In the history of the organosilicon compounds, two principal types of compounds containing more than one silicon atom have heretofore been described. In one of these types, the silicon atoms are linked directly to each other. These are the so-called polysilanes, heretofore described by Kipping. The present organosilicon industry is based upon the siloxanes, which are materials in which the silicon atoms are linked through oxygen atoms. There has been some mention in the literature heretofore of organosilicon halides containing a plurality of silicon atoms in which the silicon atoms are linked by large divalent organic radicals and the remaining valences of the silicon atoms are satisfied by chlorine.

Objects of the present invention are to produce difunctional organosilicon compounds in which the silicon atoms are linked through methylene bridges.

In accordance with the process of the present invention, compounds of this type are produced by reacting a compound of the type XCH$_2$SiR$_2$Y and a compound of the type R$_2$SiY$_2$ by contacting the former with an alkali metal in the presence of the latter. By this method, difunctional compounds of the above indicated type are produced. In the formulae, X represents a halogen, preferably chlorine or bromine, R represents monovalent hydrocarbon radicals bonded to the silicon by carbon to silicon bonding, including alkyl as from methyl to octadecyl, and monocyclicaryl such as phenyl and tolyl, and Y represents alkoxyl or halogen preferably ethoxyl, chlorine or bromine.

Compounds produced by this method are of the type formula YSiR$_2$(CH$_2$SiR$_2$)$_n$Y where R represents monovalent hydrocarbon radicals, including alkyl as from methyl to octadecyl, and monocyclicaryl such as phenyl and tolyl, $n$ represents a positive integer and Y represents alkoxyl or halogen. This result is not in accordance with expectation since a Wurtz reaction might be expected to occur between the halogenomethyl radicals. Also in connection with halogen atoms bonded to the silicon atoms, it might be expected that a disilane type of linkage would result. However, it has been found that the two components interact preferentially in a manner to give the alternating silicon carbon linkage.

The reactant of the type XCH$_2$SiR$_2$Y may be made in a variety of ways.

Thus, in the case of chloromethyl dimethyl silicon chloride, this material may be produced by the direct chlorination of trimethyl silicon chloride as described in the literature. The equivalent ester may be produced by the substitution of an alkoxyl radical for the chlorine radical by reacting the above chloride with the desired alcohol. Alternatively, these same materials may be produced by chlorinating methyl silicon trichloride to give chloromethyl silicon trichloride, which may then be reacted with a methyl Grignard reagent to give the chlormethyl dimethyl silicon chloride. In case other hydrocarbon radicals than methyl radicals are desired, the latter of the above methods may be employed. That is, the chlormethyl silicon trichloride may be reacted with other Grignard reagents than methyl Grignard, for instance, with an ethyl Grignard or higher alkyl Grignard, such as octadecyl Grignard. Likewise, in this process, aryl groups can be substituted by the use of appropriate Grignards, such as phenyl Grignard.

Compounds of the type R$_2$SiY$_2$ are well known and described in the literature.

When these two types of compounds are interacted as indicated, difunctional compounds are obtained. It is to be noted that the molecular weight of the compounds produced is to substantial extent dependent upon whether the reactants employed are esters in which Y represents an alkoxy radical or are chlorides in which Y represents a halogen and upon the relative proportions of the reactants which are employed. By the use of esters, i. e., compounds in which Y represents alkoxyl, lower molecular weight species are obtained. When chlorides are employed, higher molecular weight species are obtained generally in mixtures which are difficult to separate. Intermediate ranges may be obtained by the use of reactants containing both alkoxyl radicals and chlorine atoms bonded to the silicon. When the two reactants are employed in equivalent amount, and at least two of the three Y's are alkoxyls, the primary product is the first member of the series, end-blocked with alkoxyl radicals, the formula being

C$_2$H$_5$OSiR$_2$CH$_2$SiR$_2$OC$_2$H$_5$

The use of an excess of the compound R$_2$SiY$_2$ does not modify the result. If less than the equivalent amount thereof is employed the yield of the first member of the series is decreased and larger amounts of the higher members of the series are obtained.

The compound XCH$_2$SiR$_2$Y may be contacted with the alkali metal in the presence of the compound R$_2$SiY$_2$ by a variety of specific methods. Thus, a mixture of the two reactants may be mixed with the alkali metal. For this purpose, it is convenient to suspend the alkali metal in a liquid hydrocarbon to which suspension the mixed reactants are added. Alternatively, the alkali metal may be added to a mixture of the two reactants. By another preferred procedure, the alkali metal may be mixed with the compound $R_2SiY_2$ and the mixture then mixed with the compound $XCH_2SiR_2Y$. A preferred method of conducting the reaction is to suspend the alkali metal in a hydrocarbon boiling above the melting point of the alkali metal. The suspension is maintained at a temperature above the melting point of the alkali metal. The organic reactants are then added to the suspension preferably by adding the compound $R_2SiY_2$ first. Very rapid reaction occurs in this type of process, where the alkali metal is in finely divided molten state. It is advantageous in this mode of operation to employ low melting alloys of the alkali metals such as the sodium and potassium eutectic. If desired, sodium amide may be used.

The products of the process hereof are of utility as water-proofing agents and for preventing foaming in aqueous systems containing organic materials. The products hereof are of substantial importance as intermediates for the production of other organosilicon products. Thus, upon hydrolysis and condensation, products are obtained which contain both methylene and siloxane bridges between the silicon atoms. In the case of the product hereof which is above described which contains a single methylene bridge between two silicon atoms and a functional group on each silicon atom, the product of hydrolysis and condensation has alternating methylene and siloxane bonds between the silicon atoms. By this method a high yield of the cyclic compound is obtained which has the formula $[-CH_2Si(CH_3)_2OSi(CH_3)_2-]_2$, together with linear polymers. Hydrolysis and condensation of the higher members of the series of products produced by the present method yields fluids in which there are several methylene bridges per siloxane bridge between silicon atoms. These hydrolysis and condensation products are of unique character particularly with respect to their chemical stability. These materials are stable in the presence of concentrated sulphuric acid. Sulphuric acid of 98% concentration at 90° C. has no effect upon these products. Fuming sulphuric acid at 90° C. effects polymerization to high molecular weight fluids. Inasmuch as these products of hydrolysis and condensation are excellent lubricants, the chemical stability noted illustrates that they are particularly useful as lubricants, hydraulic fluids, damping fluids and diffusion pump fluids in special situations where chemical stability is a factor.

*Example 1*

A mixture of 322 parts by weight of sodium and 1600 parts of toluene were heated to melt the sodium and were maintained at reflux temperature at atmospheric pressure. To this refluxing mixture there was added a mixture of 969.5 parts of $(CH_3)_2SiClOC_2H_5$ and 1062.5 parts of $ClCH_2Si(CH_3)_2OC_2H_5$. The rate of addition was regulated to maintain the temperature at 105° to 115° C. The heat of reaction was removed by the coolant employed for refluxing. The product obtained by the interaction was filtered and then distilled, first to remove the toluene and then to separate the product into its components. By distillation at 20 mm. pressure there were obtained 408 parts of $$C_2H_5OSi(CH_3)_2CH_2Si(CH_3)_2OC_2H_5$$

which was a 26.5 percent yield. This material has a boiling point of 77° C. at 20 mm. A 22 percent yield in amount of 229 parts of a product having the formula $$C_2H_5OSi(CH_3)_2[CH_2Si(CH_3)_2]_2OC_2H_5$$

was obtained. This material had a boiling point of 125°–130° C. at 20 mm. pressure. A residue of higher boiling materials was obtained which were of composition similar to that above indicated but in which the compounds had as many as 5 silicon atoms per molecule. These materials are indicated by plateaus in a distillation analysis, which plateaus are 153° and 180° C.

*Example 2*

A mixture of 115 parts by weight of sodium and 800 parts of toluene were heated to 110° C. to reflux. To the refluxing mixture there was added a mixture of 444 parts of $Si(CH_3)_2(OC_2H_5)_2$ and 381.3 parts of $ClCH_2Si(CH_3)_2OC_2H_5$ at a rate to maintain the temperature at between 105° and 115° C. with the cooling available. The product was filtered. The toluene was removed by distillation and the reaction mixture was distilled under vacuum whereby there was obtained a 40 percent yield of the material indicated in Example 1 which contained 2 silicon atoms and a 4.2 percent yield of the material which contained 3 silicon atoms.

*Example 3*

A mixture of 138 parts of sodium by weight, 1600 parts of xylene and 888 parts of $$(CH_3)_2Si(OC_2H_5)_2$$

were heated to 110° C. To this mixture 429 parts of $ClCH_2Si(CH_3)_2Cl$ were added with the temperature being maintained at about 110° C. The product was filtered and distilled to recover the difunctional compounds. There was obtained a 14 percent yield of the compound described in Example 1 containing 2 silicon atoms. The higher members were not isolated.

*Example 4*

A mixture of 92 parts by weight of sodium and 400 parts of toluene were heated to reflux. To the refluxing mixture there was added a mixture of 129 parts of $(CH_3)_2SiCl_2$ and 325 parts of $ClCH_2Si(CH_3)_2OC_2H_5$. The reaction mixture was filtered and the filtrate distilled whereby there was obtained a 5 percent yield of difunctional compound containing 2 silicons linked by a methylene bridge and a 34.2 percent yield of difunctional compound containing 3 silicons linked by two methylene bridges.

*Example 5*

A mixture was made of 195 parts of toluene and 43.5 parts of molten sodium. A mixture of the following was added thereto, the components of the mixture being present in the amount indicated in parts by weight.

| Compound | Parts |
| --- | --- |
| $ClCH_2(CH_3)_2SiCl$ | 36 |
| $C_4H_9CH_3SiCl_2$ | 46 |
| $ClCH_2C_6H_5CH_3SiCl$ | 51 |
| $C_{18}H_{37}CH_3SiCl_2$ | 95 |

This mixture was added to the toluene-sodium mixture. The temperature was maintained at between 100 and 110° C. Following completion of the reaction, the reaction product was cooled, filtered, and stripped of toluene. The residue was fractionally distilled at 26 mm. pressure. The following cuts were obtained:

| No. | ml. | Boiling Range | $(n)_D^{25}$ |
| --- | --- | --- | --- |
| 1 | 11 | 83-140 | 1.4900 |
| 2 | 11 | 140-247 | 1.4926 |
| 3 | 11 | 247-249 | 1.4646 |
| 4 | 11 | 249 | 1.4658 |
| 5 | 11 | 247 | 1.4707 |
| 6 | 4 | 270 | 1.4765 |
| Residue | 47 | | 1.5116 |

The density of the residue was 0.9536. From the index of refraction and the density, the specific refraction is shown to be 0.3201. The theoretical value for this composition is 0.3255 which shows that the product is a copolymer of all of the materials employed.

The residue was a di-functional material having a hydrolyzable chlorine atom at each end of the molecule. This residue was hydrolyzed by reacting with water and the hydrolyzate was condensed. A viscous fluid was thereby obtained.

That which is claimed is:

1. $C_2H_5OSi(CH_3)_2CH_2Si(CH_3)_2OC_2H_5$.
2. $C_2H_5OSi(CH_3)_2[CH_2Si(CH_3)_2]_2OC_2H_5$.
3. The method which comprises reacting a material of the general formula $XCH_2SiR_2Y$ in liquid phase with an alkali metal in mixture with a material of the general formula $R_2SiY_2$ in liquid phase in which X represents a halogen, R represents radicals of the group consisting of monocyclicaryl and alkyl and Y represents substitutents of the group consisting of alkoxyl and halogen.
4. The method in accordance with claim 3 in which R represents methyl.
5. The method in accordance with claim 3 in which Y represents ethoxy.
6. The method in accordance with claim 3 in which Y represents chlorine.
7. The method in accordance with claim 3 in which R represents methyl and Y represents ethoxy.
8. Compositions of the general formula $$YSiR_2(CH_2SiR_2)_nY$$

where R represents radicals of the group consisting of monocyclicaryl and alkyl radicals, $n$ represents a positive integer, and Y represents an alkoxy radical.
9. Compositions in accordance with claim 8 in which $n$ is an integer of from 1 to 4 inclusive.
10. Compositions in accordance with claim 8 in which R represents methyl.
11. Compositions in accordance with claim 8 in which Y represents an ethoxy radical.
12. Compositions in accordance with claim 8 in which Y represents an ethoxy radical and $n$ is an integer of from 1 to 4 inclusive.

JOHN T. GOODWIN, JR.

REFERENCES CITED

The following references are of record in the file of this patent:

UNITED STATES PATENTS

| Number | Name | Date |
| --- | --- | --- |
| 2,352,974 | Rochow | July 4, 1944 |
| 2,444,858 | Spier | July 6, 1948 |
| 2,452,895 | Bluestein | Nov. 2, 1948 |
| 2,491,833 | Sauer | Dec. 20, 1949 |

OTHER REFERENCES

Sommer et al., "Jour. Amer. Chem. Soc.," vol. 69 (1947), page 980.

Goodwin et al., "Jour. Amer. Chem. Soc.," vol. 69 (1947), page 2247.